US010268340B2

(12) United States Patent
Chen et al.

(10) Patent No.: US 10,268,340 B2
(45) Date of Patent: Apr. 23, 2019

(54) ORGANIZING MESSAGES IN A HIERARCHICAL CHAT ROOM FRAMEWORK BASED ON TOPICS

(71) Applicant: International Business Machines Corporation, Armonk, NY (US)

(72) Inventors: Li-Ju Chen, Taipei (TW); Tzuching Kuo, Taipei (TW); Lin Chung Liang, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 610 days.

(21) Appl. No.: 14/736,369

(22) Filed: Jun. 11, 2015

(65) Prior Publication Data
US 2016/0364368 A1 Dec. 15, 2016

(51) Int. Cl.
*H04L 12/58* (2006.01)
*G06F 3/0482* (2013.01)
*G06F 17/22* (2006.01)
*G06Q 10/10* (2012.01)

(52) U.S. Cl.
CPC ......... *G06F 3/0482* (2013.01); *G06Q 10/107* (2013.01); *H04L 51/16* (2013.01); *H04L 51/04* (2013.01); *H04L 51/06* (2013.01)

(58) Field of Classification Search
CPC ............... G06F 3/0482; G06F 17/2441; G06F 17/2241; H04L 51/04; H04L 51/16
See application file for complete search history.

(56) References Cited

U.S. PATENT DOCUMENTS

| 6,104,989 | A | * | 8/2000 | Kanevsky | G06F 17/2715 704/257 |
| 6,557,027 | B1 | * | 4/2003 | Cragun | H04L 51/04 709/204 |
| 7,856,469 | B2 | | 12/2010 | Chen et al. | |
| 7,945,620 | B2 | | 5/2011 | Bou-Ghannam et al. | |
| 8,001,184 | B2 | * | 8/2011 | Etgen | G06Q 10/107 709/204 |
| 8,006,191 | B1 | * | 8/2011 | Anderson | G06Q 10/107 715/751 |

(Continued)

OTHER PUBLICATIONS

Anonymous, "User Interface Layout Optimizing the Management of Multiple Chats in an Instant Message Environment", ip.com, an IP.com Prior Art Database Technical Disclosure, IP.com Electronic Publication: Mar. 10, 2013, 6 pages, IP.com No. 000225866.

(Continued)

*Primary Examiner* — Eric J. Bycer
(74) *Attorney, Agent, or Firm* — James L. Olsen

(57) ABSTRACT

A first message may be displayed within a main chat room. The first message may be associated with a first topic. A second message may be displayed below the first message. The second message may be associated with a second topic. A third message may be received. The third message may be determined to be associated with the first topic. In response to the determining, the third message may be displayed by offsetting the third message below the first message, wherein the third message is displayed above the second message. The offsetting the third message below the first message may indicate a hierarchical relationship between the first message and the third message.

19 Claims, 12 Drawing Sheets

(56) References Cited

U.S. PATENT DOCUMENTS

| | | | |
|---|---|---|---|
| 8,015,246 B1 | 9/2011 | Anderson | |
| 8,166,408 B2* | 4/2012 | Castellucci | G06Q 10/107 |
| | | | 715/733 |
| 8,739,072 B1* | 5/2014 | Krishnamurthy | G06Q 10/109 |
| | | | 707/754 |
| 8,751,572 B1 | 6/2014 | Behforooz et al. | |
| 8,762,475 B2 | 6/2014 | Cheung et al. | |
| 8,843,835 B1 | 9/2014 | Busey et al. | |
| 2003/0023684 A1* | 1/2003 | Brown | H04L 12/1827 |
| | | | 709/204 |
| 2003/0030670 A1* | 2/2003 | Duarte | G06Q 10/10 |
| | | | 715/758 |
| 2003/0131055 A1* | 7/2003 | Yashchin | G06Q 10/107 |
| | | | 709/204 |
| 2005/0289394 A1* | 12/2005 | Arrouye | G06F 1/329 |
| | | | 714/15 |
| 2006/0174207 A1* | 8/2006 | Deshpande | G06Q 10/107 |
| | | | 715/758 |
| 2006/0248150 A1* | 11/2006 | Chaar | G06F 3/0482 |
| | | | 709/206 |
| 2007/0198646 A1* | 8/2007 | Chen | H04L 12/1822 |
| | | | 709/207 |
| 2007/0255791 A1* | 11/2007 | Bodlaender | H04L 12/1822 |
| | | | 709/206 |
| 2008/0144784 A1* | 6/2008 | Limberg | G06Q 10/107 |
| | | | 379/88.14 |
| 2009/0106366 A1* | 4/2009 | Virtanen | H04L 51/36 |
| | | | 709/206 |
| 2009/0164923 A1* | 6/2009 | Ovi | G06F 3/0482 |
| | | | 715/764 |
| 2009/0327972 A1* | 12/2009 | McCann | G06F 17/30528 |
| | | | 715/853 |
| 2010/0162138 A1* | 6/2010 | Pascal | G06Q 10/107 |
| | | | 715/758 |
| 2010/0229127 A1* | 9/2010 | Williams | G06F 3/0482 |
| | | | 715/854 |
| 2011/0282959 A1 | 11/2011 | Anderson | |
| 2012/0124147 A1* | 5/2012 | Hamlin | H04L 51/36 |
| | | | 709/206 |
| 2012/0198360 A1* | 8/2012 | Wanderski | G06Q 10/00 |
| | | | 715/758 |
| 2013/0031185 A1* | 1/2013 | Wyatt | G06Q 10/107 |
| | | | 709/206 |
| 2013/0125063 A1* | 5/2013 | Lee | G06F 3/04883 |
| | | | 715/854 |
| 2013/0218987 A1 | 8/2013 | Chudge et al. | |
| 2013/0246525 A1* | 9/2013 | Patil | G06Q 10/107 |
| | | | 709/204 |
| 2014/0040784 A1 | 2/2014 | Behforooz et al. | |
| 2014/0149891 A1* | 5/2014 | Moy | G06O 10/107 |
| | | | 715/758 |
| 2014/0304613 A1* | 10/2014 | Coe | G06F 3/04842 |
| | | | 715/752 |
| 2016/0065519 A1* | 3/2016 | Waltermann | H04L 51/16 |
| | | | 709/206 |

OTHER PUBLICATIONS

Anonymous, "A method to classify talking topics from multiple topics in a group chat", ip.com, an IP.com Prior Art Database Technical Disclosure, IP.com Electronic Publication: Sep. 25, 2014, 7 pages, IP.com No. 000238917.

Anonymous, "Method and System for Filtering Chat Messages based on Topic", ip.com, an IP.com Prior Art Database Technical Disclosure, IP.com Electronic Publication: Jun. 22, 2011, 2 pages, IP.com No. 000208083.

Mell, "The NIST Definition of Cloud Computing: Recommendations of the National Institute of Standards and Technology," National Institute of Standards and Technology, U.S. Department of Commerce, Special Publication 800-145, Sep. 2011, 7 pages, Gaithersburg, MD.

* cited by examiner

ORGANIZING MESSAGES IN A HIERARCHICAL CHAT ROOM FRAMEWORK BASED ON TOPICS

BACKGROUND

This disclosure relates generally to chat room user interfaces, and more specifically, to organizing a chat room for effective user interface.

A chat room is a virtual venue that allows users to communicate with each other in real time over a network. These venues may be utilized by various users who share common interests (e.g., clubs, teams, etc.). One form of online chat is direct one-to-one chat, called instant messaging (IM). Particular dynamics of a chat room discussion may be as follows: various users may enter a chat room and type and/or view instant messages, reply to instant messages in the chat room, save instant messages displayed during a session, and switch to different chat rooms. Various users within the chat room may discuss several topics.

SUMMARY

One or more embodiments are directed to a method, a system, and a computer program product for grouping chat room messages according to a topic. A first message may be displayed within a main chat room. The first message may be associated with a first topic. A second message may be displayed below the first message. The second message may be associated with a second topic. A third message may be received. The third message may be determined to be associated with the first topic. In response to the determining, the third message may be displayed by offsetting the third message below the first message, wherein the third message is displayed above the second message. The offsetting the third message below the first message may indicate a hierarchical relationship between the first message and the third message.

Figure 1:
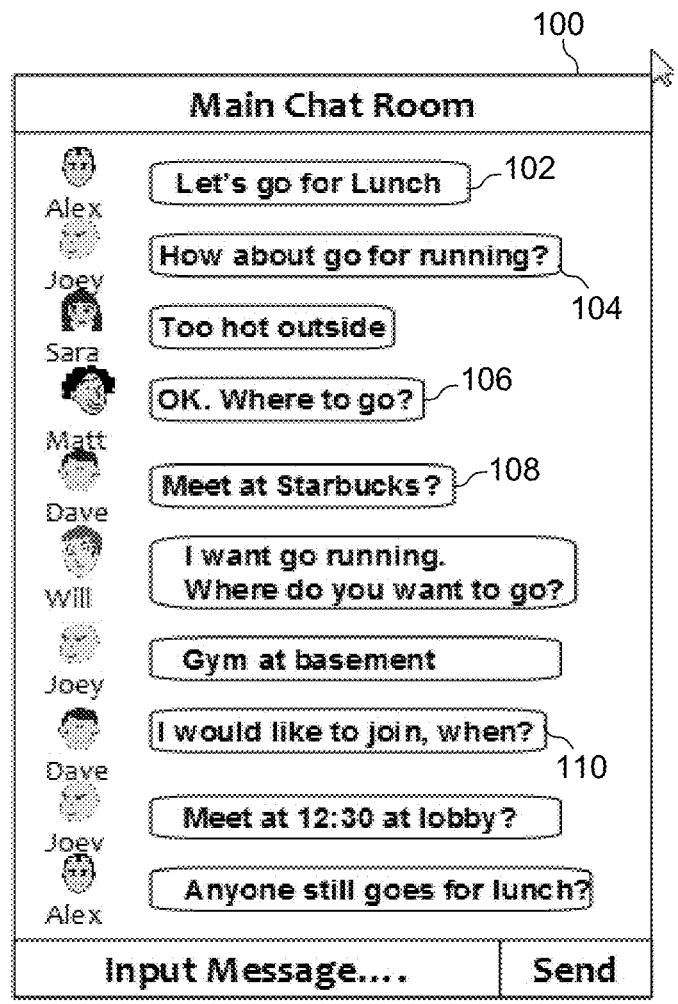
FIG. 1 is an example chat room that includes multiple users and multiple messages that correspond with different topics.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to chat room user interfaces, and more specifically, to organizing a chat room for effective user interface. While the present disclosure is not necessarily limited to such applications, various aspects of the disclosure may be appreciated through a discussion of various examples using this context.

A chat room session may include multiple users that discuss multiple topics. The various messages that reference the multiple topics may be displayed in chronological order according to the time the messages were generated. Consequently, it may be difficult for users to identify which messages belong to the corresponding topics. For example, FIG. 1 is an example chat room that includes multiple users and multiple messages that correspond with different topics.

The chat room 100 in FIG. 1 illustrates several messages (including messages 102, 104, 106, and 108) that are posted in chronological order according to the time they were generated. For example, message 102 "Let's go for Lunch," may be posted at a first time, message 104 "How about go for running?" may be posted at a second subsequent time, and the message "Too hot outside" may be posted at a third time subsequent to the second time. The message 102 "Let's go for Lunch" corresponds to a first topic—lunch. The message 104 "How about go for running?" corresponds to a second topic—running. However, it may be confusing to decipher whether Matt's message 106 "OK. Where to go?" is referring to message 102 or message 104. Accordingly, the question of "where to go" in message 106 may be a response to the topic of "lunch" in message 102 or just as equally be a response to the topic of "running" in message 104. Further, Dave's message 108 "Meet at Starbucks?" may also be referring to meeting at Starbucks for "lunch" according to message 102, or be referring to meeting at Starbucks to go "running" according to message 104. Moreover, Dave's message 110 "I would like to join, when?" may be referring to joining "lunch" according to message 102, or joining "running" according to message 104. This may make it very difficult to for a group of users to follow conversations that are occurring within a chat room.

In some examples, a user who is interested in the topic of lunch according to message 102 may open a separate chat room to continue discussion on the topic of lunch. However, if a user opens up a new chat room, the user may have to re-invite all chat users to the discussion, and the invited chat users may still have to take steps (e.g., accept the invite) to join the chat about lunch. Alternatively, the user may send a private message to the user who started the lunch topic. However, private messages are not viewable by other chat users, which may make it difficult for all of the users of a chat forum to determine the status of a topic. In some examples, topics may grouped in a seemingly organized fashion, such as through corresponding control buttons, or through pooling the topics in a single window. However, it still may be difficult for users to decipher which user is responsible for which message according to a particular topic. Accordingly, embodiments of the present disclosure are directed to providing a graphical user interface (GUI) that displays a reply message by offsetting the reply message below an original message in a main chat room. The offsetting of the reply message may indicate a hierarchical relationship between the original message and a reply message (e.g., the original message first discussed a topic and a reply message follows the discussion of the topic). The offsetting of the reply message may allow users to quickly identify topics, and determine how various users are responding to the topics.

Figure 2:
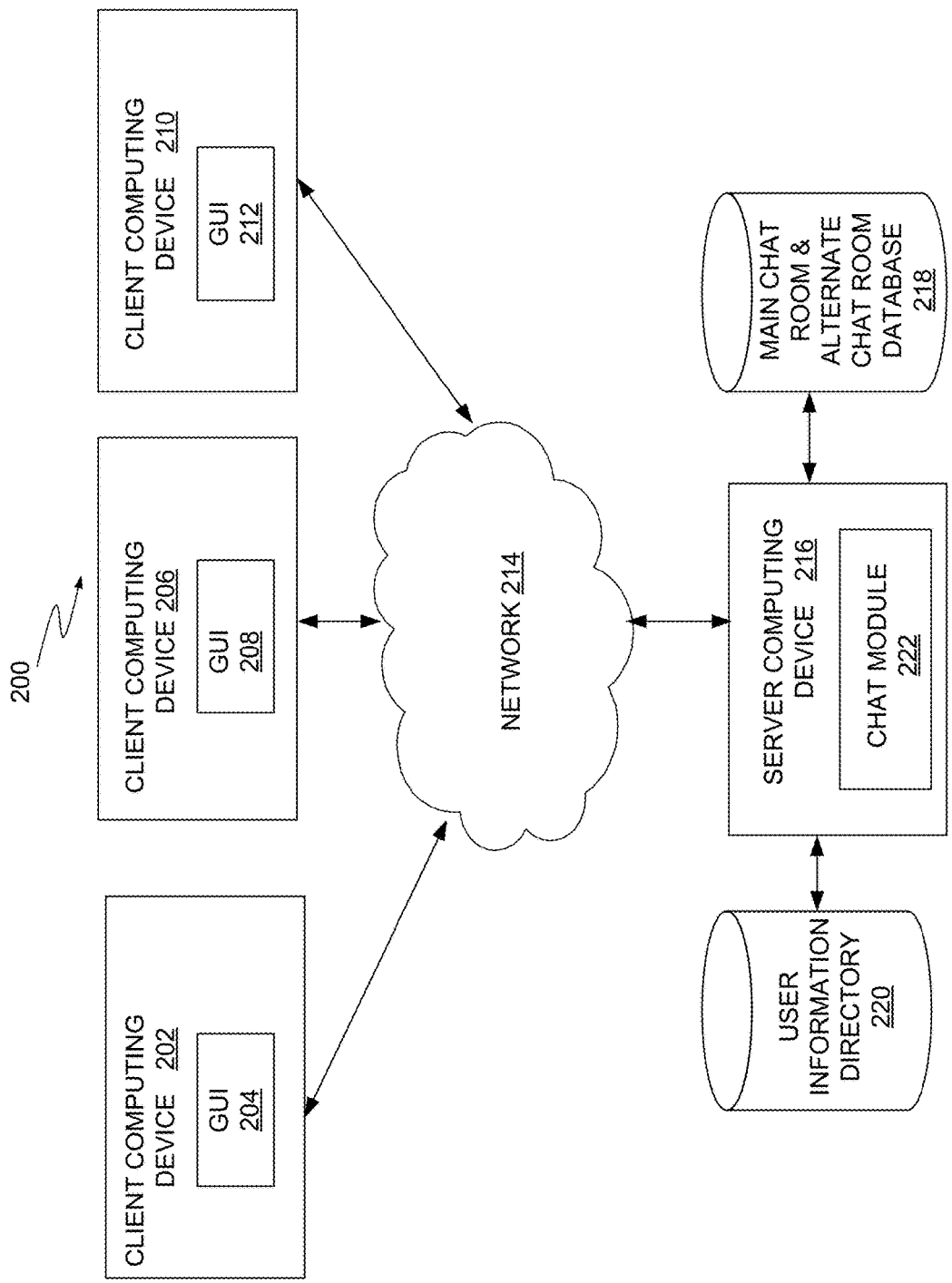
FIG. 2 is a block diagram of an example chat room environment, with respect to embodiments.

FIG. 2 is a block diagram of an example chat room environment 200, according to embodiments. The chat room environment 200 may include various client computing devices with corresponding GUIs for interacting with users in a chat room. For example, the chat room environment 200 may include client computing device 202 and GUI 204, client computing device 206 and GUI 208, and client computing device 210 and GUI 212. The chat room environment 200 may also include network 214, a server computing device 216 that includes a chat module 222, a user information directory 220, and a main chat room and alternate chat room database 218. In some embodiments, the chat room environment 200 may be (or include) the cloud computing environment 50 of FIG. 11, which is described more below.

Figure 10:
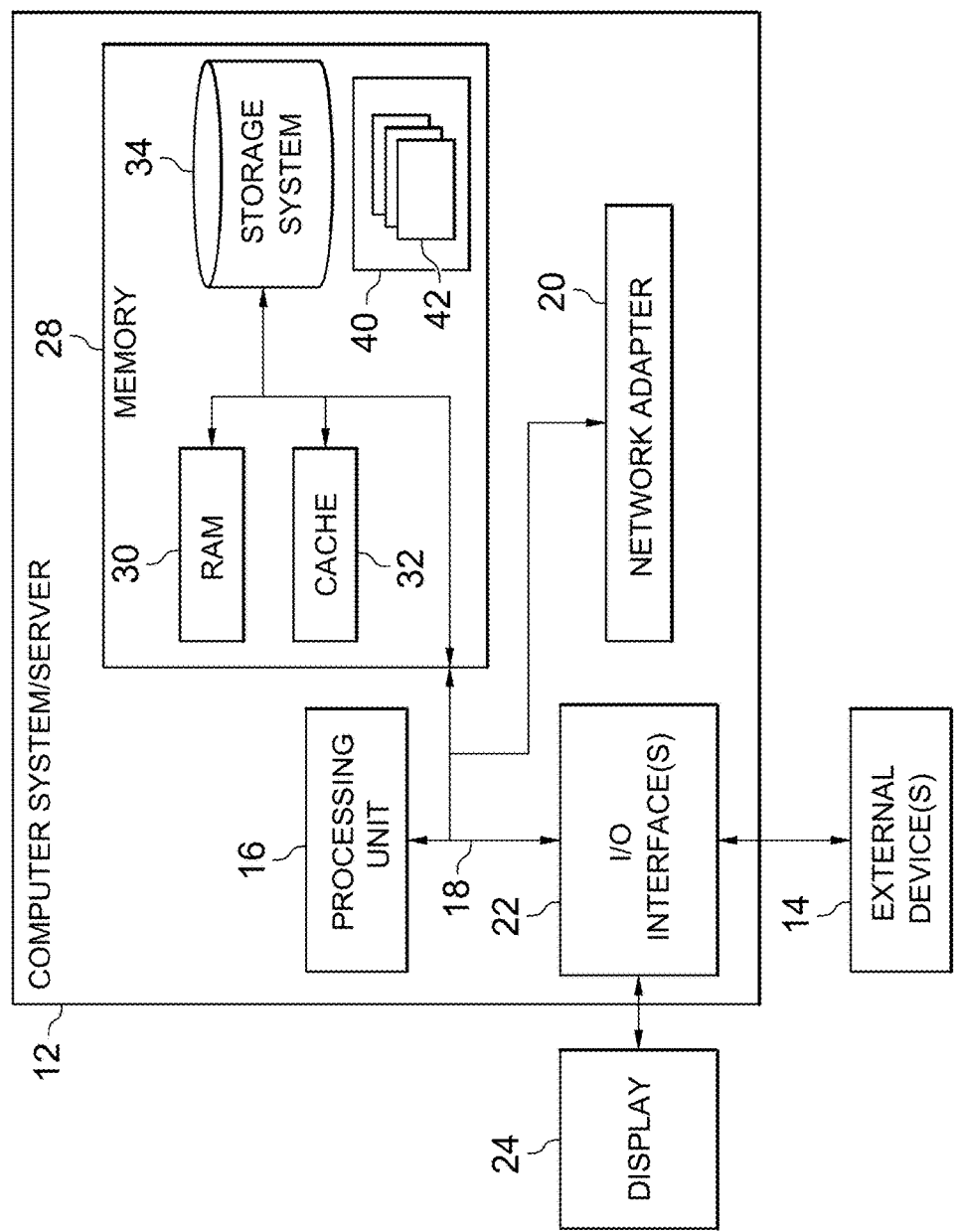
FIG. 10 depicts a cloud computing node, according to embodiments.

In some embodiments, the client computing devices 202, 206, and/or 210 may be configured according to the computer system/server 12 as described in FIG. 10. The client computing devices 202, 206, and/or 210 may each correspond to associated users that are utilizing a chat room to discuss various topics. Each user's client computing device may include an associated GUI (GUI 204, 208, and 212), which may be a program interface that allows each user to efficiently identify various topics within a chat room and determine how various users are responding to each topic. In some embodiments, the GUIs 204, 208, or 212 may be part of an operating system component within the respective client computing devices 202, 206, and/or 210. In embodiments, the GUIs 204, 208, or 212, may be a module stored in the memory 28 of computer system/server 12, according to FIG. 10. The GUIs 204, 208, and 212 may include various mechanisms, such as pointers to allow a user to select different options. For example, according to embodiments, and as described in more detail below, a user may use a pointer to select an option to reply to a message within a main chat room or alternate chat room. The GUIs 204, 208, and 212 may also include various control buttons. According to embodiments, and as described in more detail below, the GUI may include offset reply messages within a main chat room, shortcut control buttons to allow a user to easily transfer from a main chat room to an alternate chat room, and control buttons to display a particular unread message. The GUIs 204, 208, and 212 may also include windows, menus, or any other suitable object for embodiments of the present disclosure.

Each of the client computing devices 202, 206, and 210 may transmit and receive various instant messages via the network 214, according to user requests. The network 214 may be any suitable network for embodiments of the present disclosure. For example, the network 214 may be a Local Area Network (LAN), a Wide Area Network (WAN), or public network (e.g., the internet).

The server computing device 216 may transmit or receive the instant messages that are being transmitted or received through each client computing device 202, 206, and 210, via the network 214. For example, a first user may generate an instant message within a chat room to be sent to each user. The first user's client computing device 202 may transmit the instant message to the server computing device 216. The server computing device 216, after resolving user information, may transmit the instant message to each of the client computing devices 202, 206, and 210, such that each user may read the displayed instant message. The server computing device 216 may include a chat module 222 that organizes each message within different chat rooms such as main and alternate chat rooms, as described more below.

The server computing device 216 may utilize a main chat room and alternate chat room database 218. The main chat room and alternate chat room database 218 may store information concerning main chat rooms and alternate chat rooms. For example, the main chat room and alternate chat room database 218 may store information that includes the quantity of unread messages in each chat room, a quantity of users utilizing each chat room, etc. The main chat room may be for use in discussing several topics amongst members of a chat forum. The alternate chat room may be for use in discussing individual topics, as described more below.

The server computing device 216 may also utilize a user information directory 220. The user information directory 220 may be a database that includes information regarding various users within a chat room forum, such as user profiles, authentication and authorization information of each user, etc.

Figure 3:
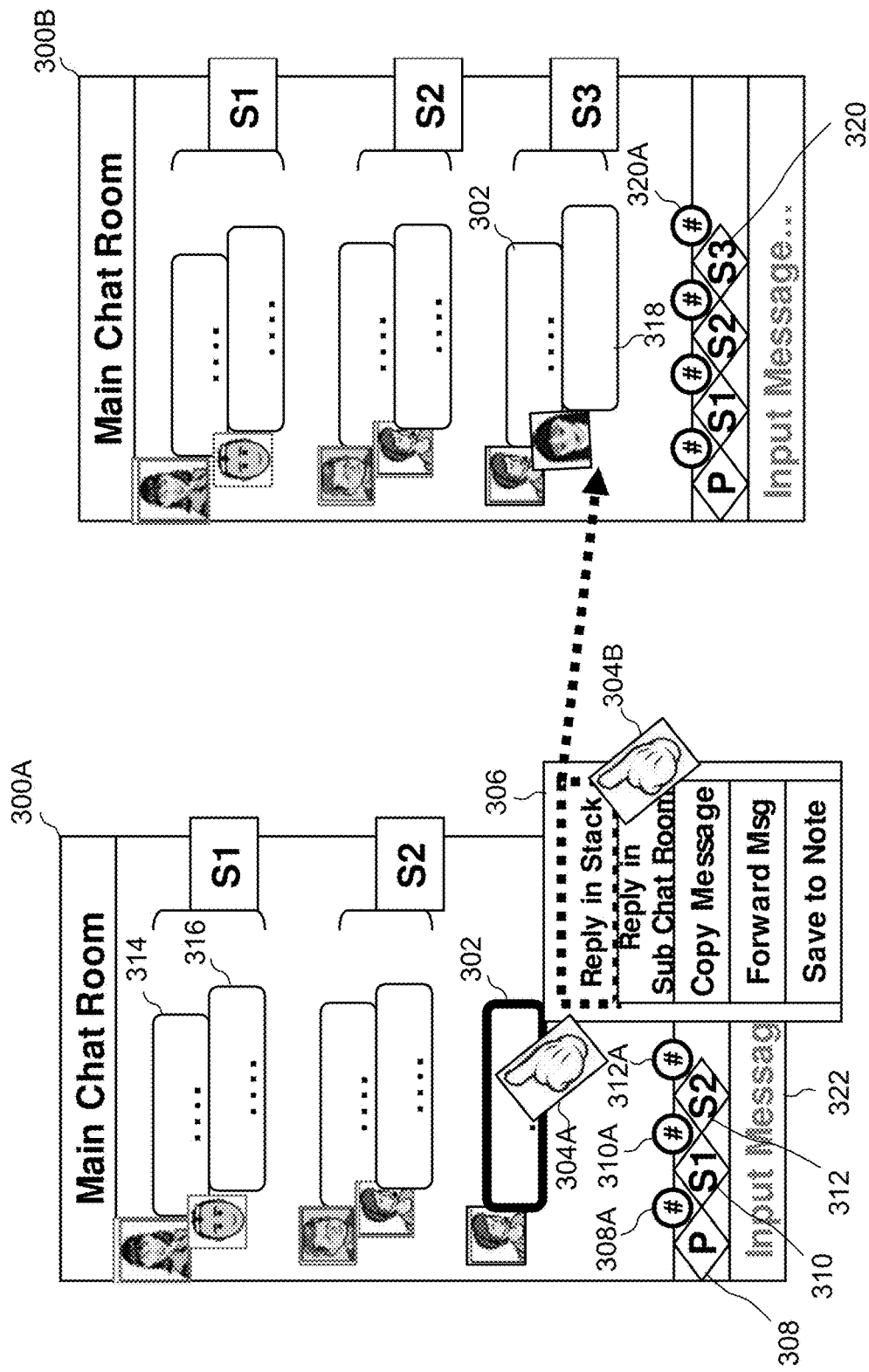
FIG. 3 is an example diagram of a main chat room GUI that illustrates a user replying to an original message within the main chat room, according to embodiments.

FIG. 3 is an example diagram of a main chat room GUI that illustrates a user replying to an original message within the main chat room, according to embodiments. Main chat room 300A may be a main chat room as it exists at a first time. Main chat room 300B may be the same chat room as it exists at a second subsequent time. Main chat room 300A may include various grouped instant messages (e.g., S1 and S2) that correspond to a particular forum (e.g., a running club chat room). Message 316 is offset under message 314, indicating that S1 pertains to a particular topic. For example, Message 314 may correspond to a first topic (e.g., which marathon to attend) and message 316 may correspond to a reply to message 314 (e.g., attending the State Marathon).

In embodiments, P control button 308 may correspond to an icon that a user may select to remain in the main chat room. Control button 308A may correspond to an icon that provides user access to one or more unread instant messages within the main chat room 300A. For example, when a user selects the control button 308A, a first message may be displayed that has not been read yet. The control button 308A may also specify a quantity of unread messages that are within the main chat room 300A (e.g., "12 unread messages").

The S1 control button 310 may correspond to an icon that provides user access to a first generated alternate chat room (hereinafter referred to as a "sub-chat room"). For example, when a first user generates a reply message 316 to an original message 314, a sub-chat room may be created (e.g., S1 sub-chat room that includes messages 314 and 316). In some embodiments, sub-chat rooms are generated to seamlessly allow a user to continue thorough discussions regarding a topic without re-inviting each user. Sub-chat rooms are discussed in greater detail below. Control button 310A may correspond to an icon that provides user access to one or more unread instant messages within the sub-chat room S1 (i.e., the sub-chat room discussing the topic of message 314). Control button 310A may also specify a quantity of unread messages within sub-chat room S1. Moreover, S2 control button 312 may also correspond to an icon that provides user access to a second created sub-chat room (e.g., for a topic that instant messages S2 are discussing). Control button 312A may correspond to an icon that provides user access to one or more unread instant messages within sub-chat room S2. Control button 312A may also specify the quantity of unread messages within the sub-chat room S2.

Main chat room 300B may be an update to the main chat room 300A. For example, at a first time, a computing device may receive a user request to reply to message 302. Message 302 may specify a third discussed topic (e.g., which hotel to stay in at a particular marathon venue). Accordingly, the reply message 318 may be a response to the message 302 (e.g., Hotel X). At the first time, in main chat room 300A, a computing device may receive the request when a user that is associated with message 318 first selects the message 302 within main chat room 300A by using a pointer 304A. In some embodiments, however, the user may use a touch pad system that is responsive to various user gestures. In alternative embodiments, the user may utilize other selecting mechanisms such as voice activation commands (e.g., as a part of speech recognition engines) to select message 302. In yet other embodiments, a user may not have to select the message 302 at all, as a computing device GUI may utilize a program (e.g., a natural language processing (NLP) module) to parse the text of message 318 and determine that it is associated with the topic that corresponds to message 302. Accordingly, a user may generate the message 318, send it, and the GUI program may determine that the message 318 is associated with the topic that corresponds to message 302 and may therefore offset the message 318 under message 302, as illustrated in main chat room 300B.

In some embodiments, when the user selects the message 302, a menu 306 may be displayed that specifies a first option of whether the user wants to reply to message 302 within the main chat room (i.e., "Reply in Stack"), or a second option of whether the user wants to reply to message 302 within a sub-chat room (i.e., "Reply in Sub-Chat Room"). According to the illustration in main chat room 300A, a user may use a pointer 304B to select the "Reply in Stack" option. This option may correspond to a computing device receiving the user request to reply to the message 302 within the main chat room 300B. In some embodiments, as soon as the user generates the message in the input message box 322 and sends the message, a computing device GUI program may display by offsetting the message 318 under message 302 within the main chat room 300B.

In some embodiments, in response to the message 318 being offset below message 302, the user's computing device GUI program may generate for display within the main chat room 300B, a corresponding S3 control button 320 that provides user access to a third sub-chat room for use in discussing a third topic. Accordingly, for example, a user who enters main chat room 300B, may see that a topic is of interest, and instead of replying within the main chat room 300B, the user may select the control button 320, which may provide user access to the third sub-chat room. In some embodiments, after the third sub-chat room is created (and also the S3 control button), a control button 320A may be available for users to both see the quantity of unread messages in the third sub-chat room, and also have access to unread messages in the third sub-chat room when selecting the control button 320A.

Figure 4:
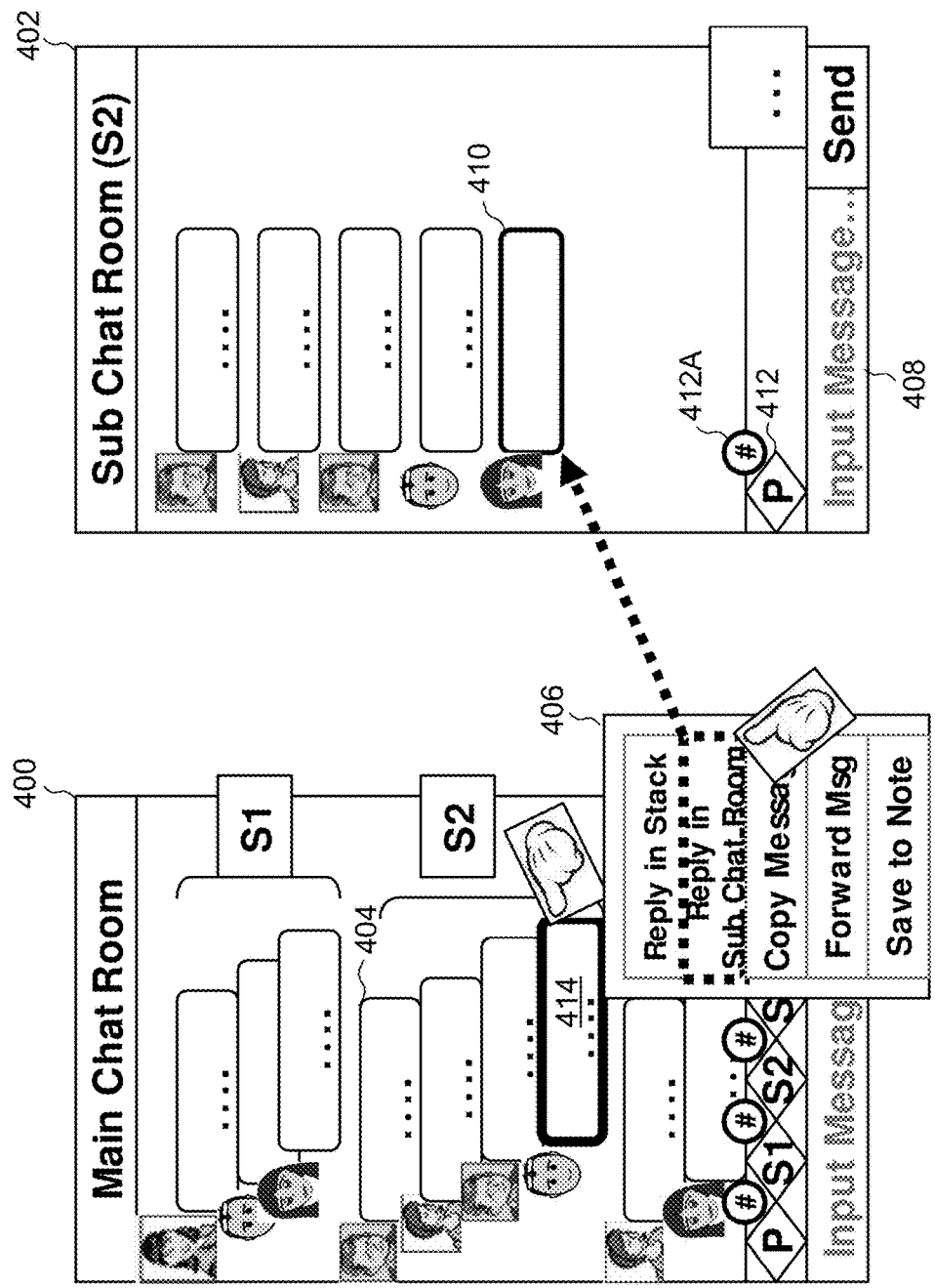
FIG. 4 is an example diagram that illustrates a user selecting an option to reply to a message in a sub-chat room, according to embodiments.

FIG. 4 is an example diagram that illustrates a user selecting an option to reply to a message in a sub-chat room, according to embodiments. Instead of selecting to reply to a message within a main chat room, as specified in FIG. 3 above, a user may choose to reply within a sub-chat room as illustrated in FIG. 4. Within the main chat room 400 a user may decide he or she wants to comment on a particular message 414 or topic group (e.g., the S2 bracket). Accordingly, and in some embodiments, the user may select with a pointer on message 414 to respond to message 414 (or the S2 topic group). In other embodiments, the user may select with the pointer on message 404 instead of 414 to continue discussion of a particular topic. In the illustrative example of FIG. 4, when the user selects the message 414, a menu 406 may display options that specify whether the user desires to respond to the message 414 (or the S2 topic group) in the main chat room or in a sub-chat room. The user may select the option to reply in a sub-chat room. The user's computing device GUI program may consequently generate the sub-chat room 402 and display the reply message within the sub-chat room 402. In some embodiments, as soon as the user selects the sub-chat room for reply and the GUI program generates the sub-chat room 402, the computing device may virtually transfer the user from the main chat room 400 to the sub-chat room 402 (S2). In some embodiments, the main chat room 400 may be displayed in a first window, and the sub-chat room 402 may be displayed in a second window. The user may then generate the message in the input message field 408. In some embodiments, when the user sends the message 410 it may be displayed in sub-chat room 402. In various embodiments, as soon as the user sends the message 410 to be placed in the sub-chat room 402, the computing device GUI program may also offset the message 410 under the message 414 within the main chat room 400 and/or the sub chat room 402. The offsetting of the message 410 within the main chat room 400 may occur so that another user may briefly scan the main chat room 400 without going into the sub-chat room 402 in order to assess discussion of a particular topic.

Consistent with embodiments, the sub-chat room 402 may include a P control button 412 that provides user access to the main chat room 400. The sub-chat room 402 may also include a control button 412A that specifies a quantity of unread messages that are within the main chat room 400 and each of the sub-chat rooms, which may include sub-chat room 402. The quantity of unread messages within sub-chat rooms is described in more detail below. The control button 412A may also provide access to any of the unread messages within the main chat room 400 and/or any of the sub-chat rooms (e.g., sub-chat room 402).

Figure 5:
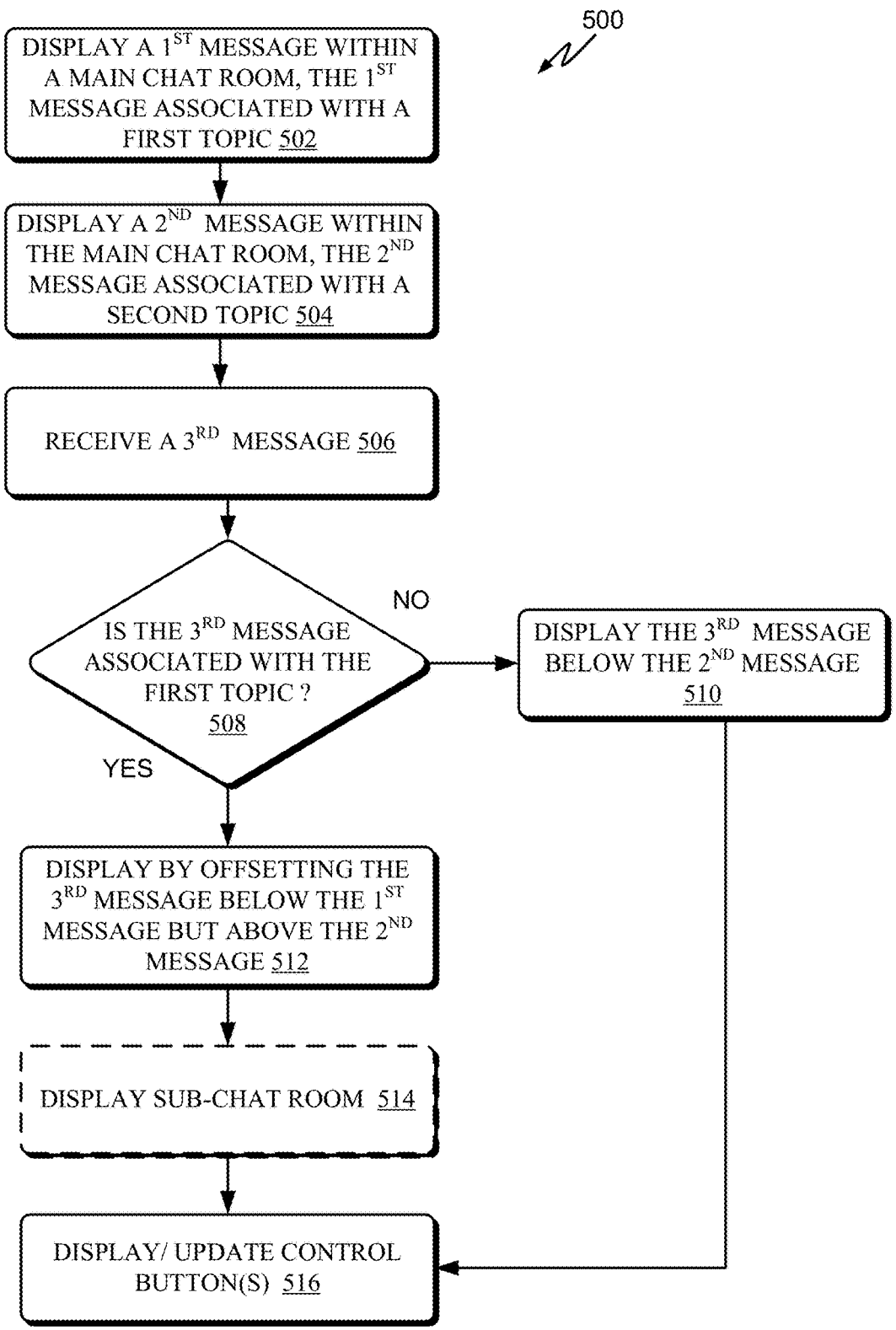
FIG. 5 is a flow diagram of an example process for offsetting a reply message below an original message, according to embodiments.

FIG. 5 is a flow diagram of an example process 500 for offsetting a reply message below an original message, according to embodiments. In some embodiments, the process 500 may begin when a computing device displays a first message within a main chat room that is associated with a first topic per block 502. Per block 504, the computing device may also display a second message within the main chat room. The second message may be associated with a second topic. Per block 506, the computing device may receive a third message.

Per block 508, the computing device may determine whether the third message is associated with the first topic in various manners, as described above. For example, a user may select the first message to reply to the first message with the third message. A menu may consequently be displayed that provides an option of whether the user wants to reply to the first message in a main chat room or sub-chat room.

Accordingly, in response to the user selecting the option to reply to the first message in a main chat room or sub-chat room (or when the user sends the third message in the main chat room or sub-chat room), the computing device may determine that the third message is associated with the first topic. Alternatively, the computing device may utilize a NLP module to determine if the third message is associated with the first topic.

In some embodiments, if the third message is not associated with the first topic, then the computing device may, per block 510, display the third message below the second message. In these embodiments, the third message may not be offset below the first or second message to indicate a hierarchical relationship. Therefore, the third message may be displayed directly below the second message to indicate that a separate topic has been formed (e.g., analogous to the messages within sub-chat room 402 of FIG. 4).

If the third message is associated with the first topic, then the computing device may display, per block 512, the third message by offsetting the third message below the first message. However, the third message may be displayed above the second message. The offsetting may indicate a hierarchical relationship between the first message and third message For example, as illustrated in FIG. 3, the computing device may display by offsetting message 316 below message 314.

In some embodiments, per block 514, the computing device may display a sub-chat room. In various embodiments, the displaying of the sub-chat room may be in response to a user request to reply to the first message within the sub-chat room. The sub-chat room may be for use in discussing the first topic. Discussing the first topic within a sub-chat room may be useful for extended discussion regarding the first topic. For example, the third message and other reply messages may include 300 words per message. These messages may not be completely visible within a main chat room but may be visible within a sub-chat room. Accordingly, users may be better able to view and assess a particular topic within a sub-chat room.

The computing device may display or update, per block 516, various control buttons. For example, after the computing device displays by offsetting the third message below the first message, the computing device may display within the main chat room a control button that provides user access to an associated sub-chat room (e.g., S1 control button 310 of FIG. 3) for discussion of the first topic. In embodiments, the computing device may generate a control button that both specifies a quantity of unread messages and when selected, the control button may transfer the user to a first unread message within the main chat room or sub-chat room (e.g., control button 308A of FIG. 3).

Figure 6:
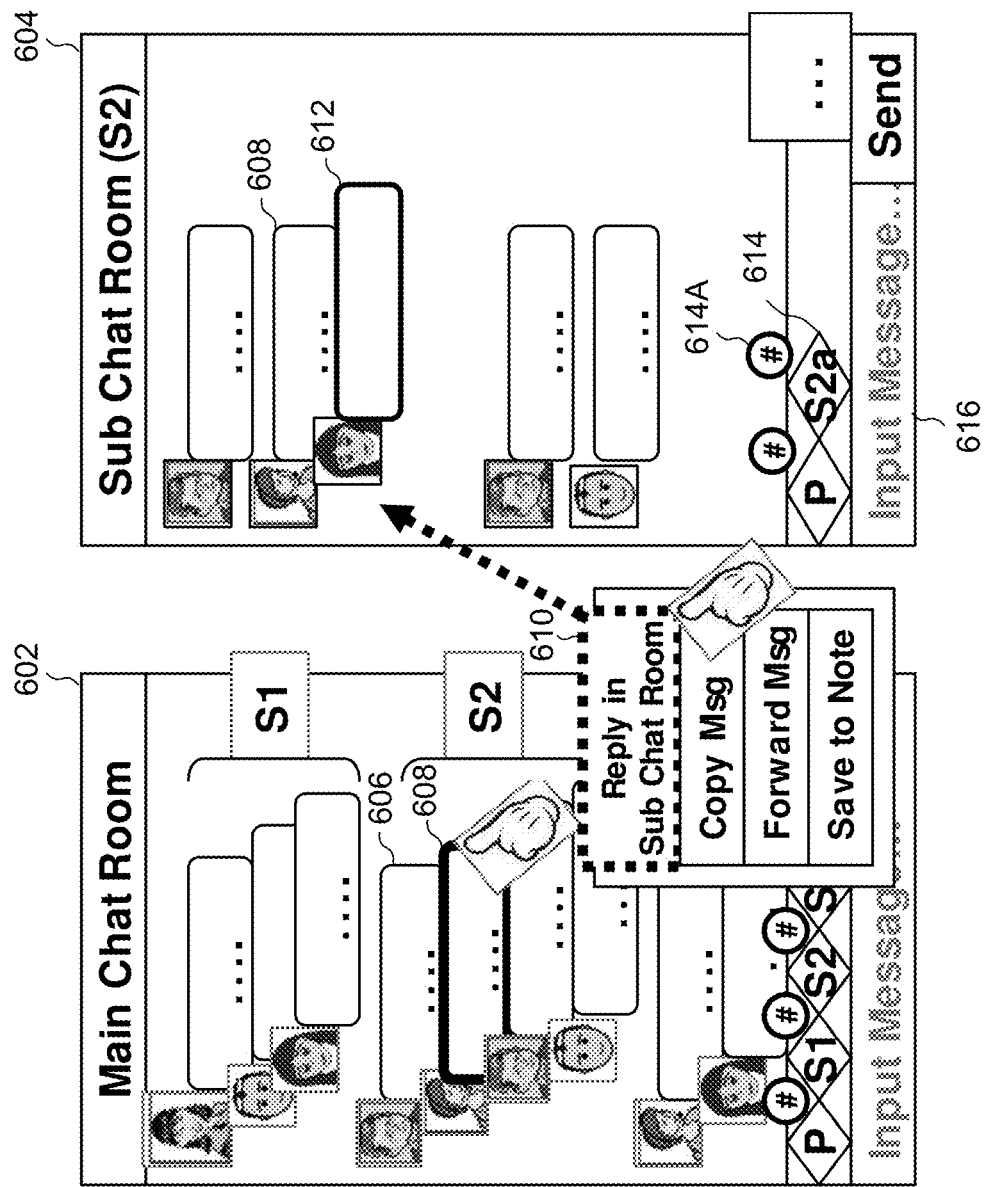
FIG. 6 is an example diagram illustrating a user replying to an existing offset message that specifies a subordinate topic, according to embodiments.

FIG. 6 is an example diagram illustrating a user replying to an existing offset message that specifies a subordinate topic, according to embodiments. In some embodiments, a user may desire to respond to a message that is a reply to a first original message. For example, in main chat room 602, instead of a user replying to a message that discusses an original topic (e.g., the original topic being where to go to dinner), such as message 606, a user may choose to respond to a reply message 608 (e.g., specifying restaurant X for dinner; restaurant X being the subordinate topic). In some embodiments, in order to respond to message 608, the user may select with a pointer on message 608. In some embodiments, the menu 610 that is displayed may only give the user the option to reply in a sub-chat room. In other embodiments, however, the user may choose to reply in a main chat room. Consistent with the illustration in FIG. 6, the user may reply in an associated sub-chat room 604. Accordingly, a computing device may generate and display sub-chat room 604. The user may then generate the reply message in the input message field 616 (e.g., using the example above, "restaurant X is a good restaurant") and when the user selects a send control button, the computing device may then determine that the message 612 is associated with the subordinate topic. Consequently, the message 612 may be displayed by offsetting the message 612 under message 608 within the sub-chat room 604. Message 612 may correspond to the message the user generated within the input message field 616.

In some embodiments, when the user sends message 612, the computing device may generate a child sub-chat room (i.e., an alternate chat room) from sub-chat room 604 in order to allow users to discuss message 612 in a separate chat room, as discussed below. In embodiments, when the child sub-chat room is generated, the computing device may generate and display a control button 614 within S2 sub-chat room 604. The generation of the S2a control button 614 may occur to allow other users to choose to chat about the topic of message 612 (i.e., the subordinate topic of message 608) within the separate child sub-chat room. The GUI may also generate control button 614A, which may specify a quantity of unread messages within the child sub-chat room and, when selected, may transfer the user to the first unread message within the child sub-chat room.

Figure 7:
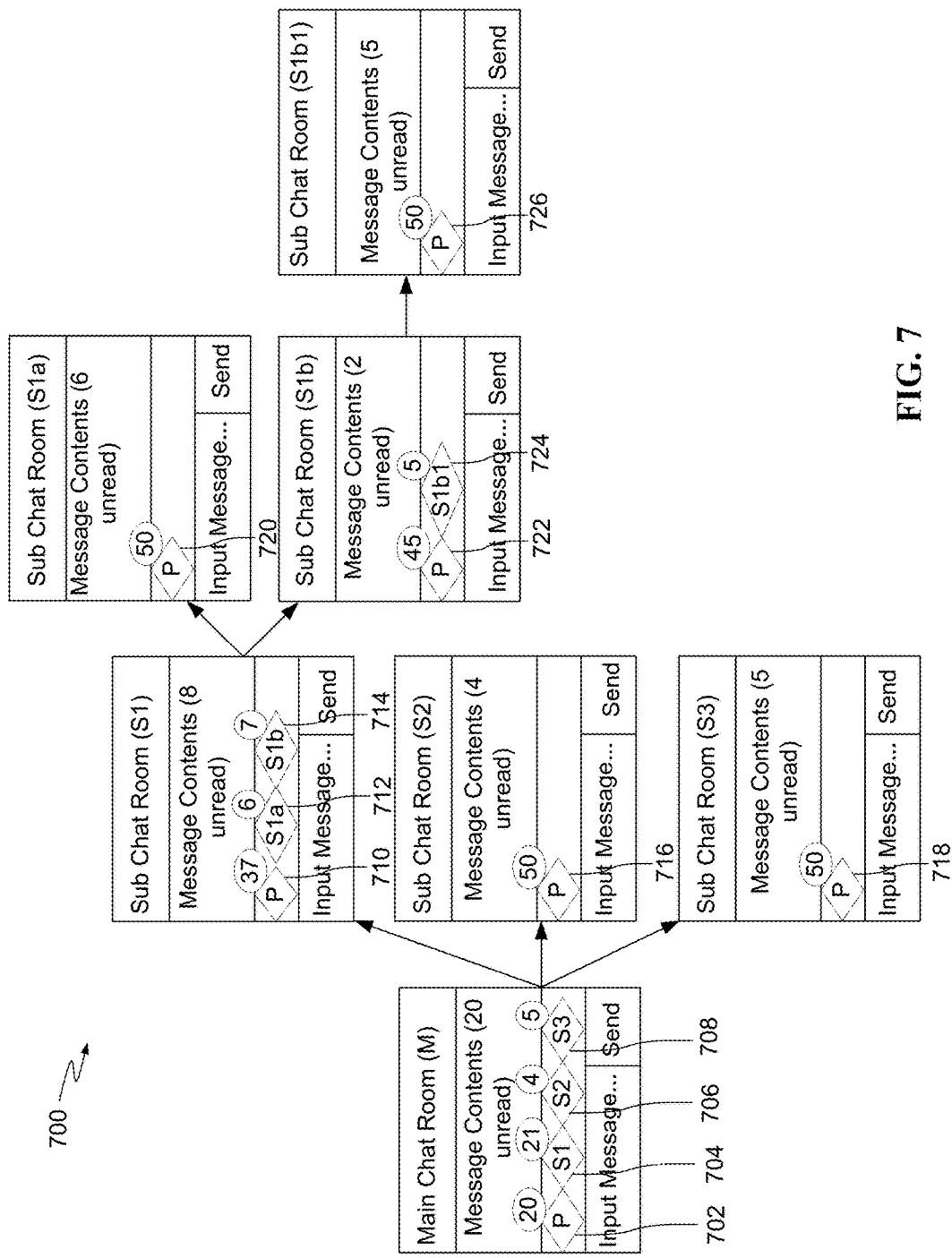
FIG. 7 is an example diagram illustrating an entire chat room session environment, according to embodiments.

FIG. 7 is an example diagram illustrating an entire chat room session environment 700, according to embodiments. The chat room session environment 700 may include a main chat room (M), which has 3 child sub-chat rooms—S1, S2, and S3. Sub-chat room S1 may include 2 child sub-chat rooms—S1a and S1b. Sub-chat room S1b may include one child sub-chat room S1b1. According to the illustration in FIG. 7, there may be 20 unread original (e.g., non-offset) messages, as illustrated by the "20" above the control button 702. In some embodiments, the circular shape that houses the "20," may be a separate control button such that a user may select the control button to arrive at a first respective unread message within the main chat room. In other embodiments, the "20" may be a stand-alone and non-selectable number above the other control buttons (e.g., control button 702). If a user is chatting within the main chat room M, he or she may determine a quantity of unread messages of each of the sub-chat rooms. For example, in the main chat room (M), the user may determine that sub-chat room S1 has 21 unread messages, as indicated directly above the control button 704. The user may also determine that sub-chat room S2 has 4 unread messages, according to the number above control button 706. Moreover, the user may determine that sub-chat room S3 has 5 unread messages according to the number above control button 708.

In embodiments, if a user enters sub-chat room S1, the user may also determine any of S1's child unread messages. For example, the user may see that sub-chat room S1 itself has 8 unread messages (e.g., as viewable in the message contents), that sub-chat room S1a has 6 unread messages, according to the number above control button 712, and that sub-chat room S1b includes 7 unread messages, according to the number above control button 714. Therefore, in some embodiments, the total number of unread messages in S1 as specified in the main chat room (21), is a result of adding the S1 unread messages, S1a unread messages, and S1b unread messages (i.e., 8+7+6=21). In some embodiments, the number above the P control button 710 within sub-chat room S1

(37) may provide the number of unread messages within the main chat room and within each of the sub-chat rooms S1, S2, and S3 (20+8+4+5=37).

In embodiments, if the user transfers from the sub-chat room S1 to sub-chat room S1a, the user may only see P control button 720, which may give the number of unread messages within the main chat room (50). In some embodiments, the number above any of the control buttons (e.g., the "50" above the control button 720) may specify the number of unread messages within the main chat room, or the number of unread messages within the immediate child's parent chat room. For example, the number above the control button 720 may specify that the total number of unread messages within the main chat room is 50 (20+21+4+5). In other embodiments, the control button 720 may specify the number of unread messages of S1a's parents (S1), which would be 21. In some embodiments, there are no other control buttons within sub-chat room S1a, as S1a has no other children sub-chat rooms.

According to various embodiments, if a user was transferred from sub-chat room S1 to sub-chat room S1b, the user may also see any of S1b's child unread messages. For example, the user may see that sub-chat room S1b1 has a total of 5 unread messages, according to the number above control button 724. The user may also see that sub-chat room S1b itself (e.g., via the body of the chat room) has 2 unread messages. The user may further see the number of unread messages (45) within all of the chat rooms other than S1b and S1b1, as indicated by the control button 722. In some embodiments, even within the sub-chat room S1b1, the user may still see how many total unread messages there are within all of the chat rooms, which is 50 as specified above control button 726. As specified in the number above the control button 714 within sub-chat room S1, there are 7 unread messages. This calculation may occur by adding the number above the control button 724 plus the number of unread messages within the "message contents" of sub-chat room S1b (i.e., 5+2=7).

In embodiments, sub-chat rooms S2 and S3 may not have any sub-chat rooms, which is why there may be no control buttons, other than respective P control buttons 716 and 718. The numbers above control buttons 716 and 718 (50) may specify the total number of unread messages within the main chat room M, or in other words, the total number of messages within each chat room.

In an illustrative example of the chat room session environment 700, the main chat room (M) may be a forum, where multiple users are members of a book club. One or more users may have generated 3 different messages that involve three different topics within the main chat room (M). For example messages regarding book A, book B, and book C may correspond to 3 different topics. A user may have generated a reply message concerning book A and consequently, sub-chat room S1 may be displayed. Another user may have generated a reply message concerning book B and consequently, sub-chat room S2 would be displayed. Moreover, a third user may have generated a reply message concerning book C and consequently, sub-chat room S3 may be displayed. If the user who initiated a request for sub-chat room S1 wrote a message that discussed an associated movie (i.e. subordinate topic) of book A, another user may reply to that S1 message about the movie and sub-chat room S1a may be consequently displayed. Further, another user may also comment on the movie of book A, and make a remark concerning how good a particular actor (i.e., subordinate topic) is within the movie A. Accordingly, this comment may be responsible for the generating and displaying of sub-chat room S1b. Another user may respond to this message about how good the particular actor is by generating a message that discusses the actor's other movies (i.e., "actor's other movies' is the child subordinate topic of the subordinate topic of the actor within the movie A). This message may cause the generation and display of sub-chat room S1b1.

Figure 8:
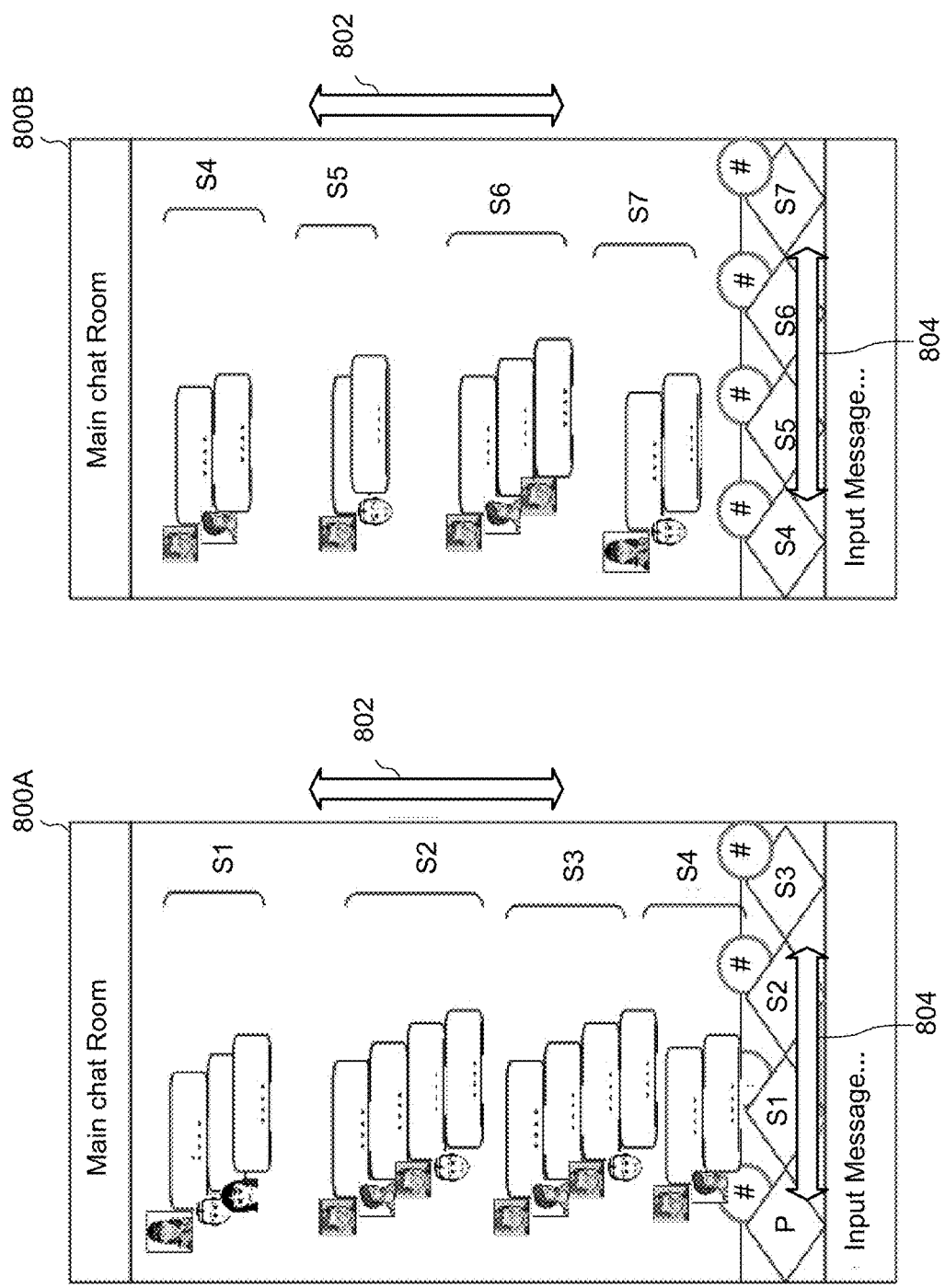
FIG. 8 is an example diagram illustrating the scrollable functions of a main chat room GUI, according to embodiments.

FIG. 8 is an example diagram illustrating the scrollable functions of a main chat room GUI, according to embodiments. The user may view any of the hierarchically related messages S1, S2, S3, S4, S5, S6, and/or S7 (as indicated by the brackets) by utilizing a vertical scroll bar 802 (or touch gesture) to scroll up or down to the desired messages. The user may also view any of the associated sub-chat rooms S1, S2, S3, S4, S5, S6, and/or S7 (as indicated by the diamond shapes) by utilizing a horizontal scroll bar 804 (or touch gesture) to scroll horizontally to the desired sub-chat room. In an illustrative example, main chat room 800A may be a main chat room as it is displayed at a first time, and the main chat room 800B may be the same main chat room as it is displayed at a second subsequent time. Within the main chat room 800A, the user may first view groups of hierarchically related messages S1, S2, S3, and S4 (as indicated by the brackets). The user may utilize the vertical scroll bar 802 within the main chat room 800A to view main chat room 800B, which corresponds to viewing the grouped messages S4, S5, S6, and S7 (as indicated by the brackets). Moreover, within the main chat room 800A the user may view the sub-chat rooms S1, S2, and S3 (as indicated by the diamond shapes). The user may utilize the horizontal scroll bar 804 within main chat room 800A to view the sub-chat rooms S4, S5, S6, and S7 (as indicated by the diamond shapes) within the main chat room 800B.

Figure 9:
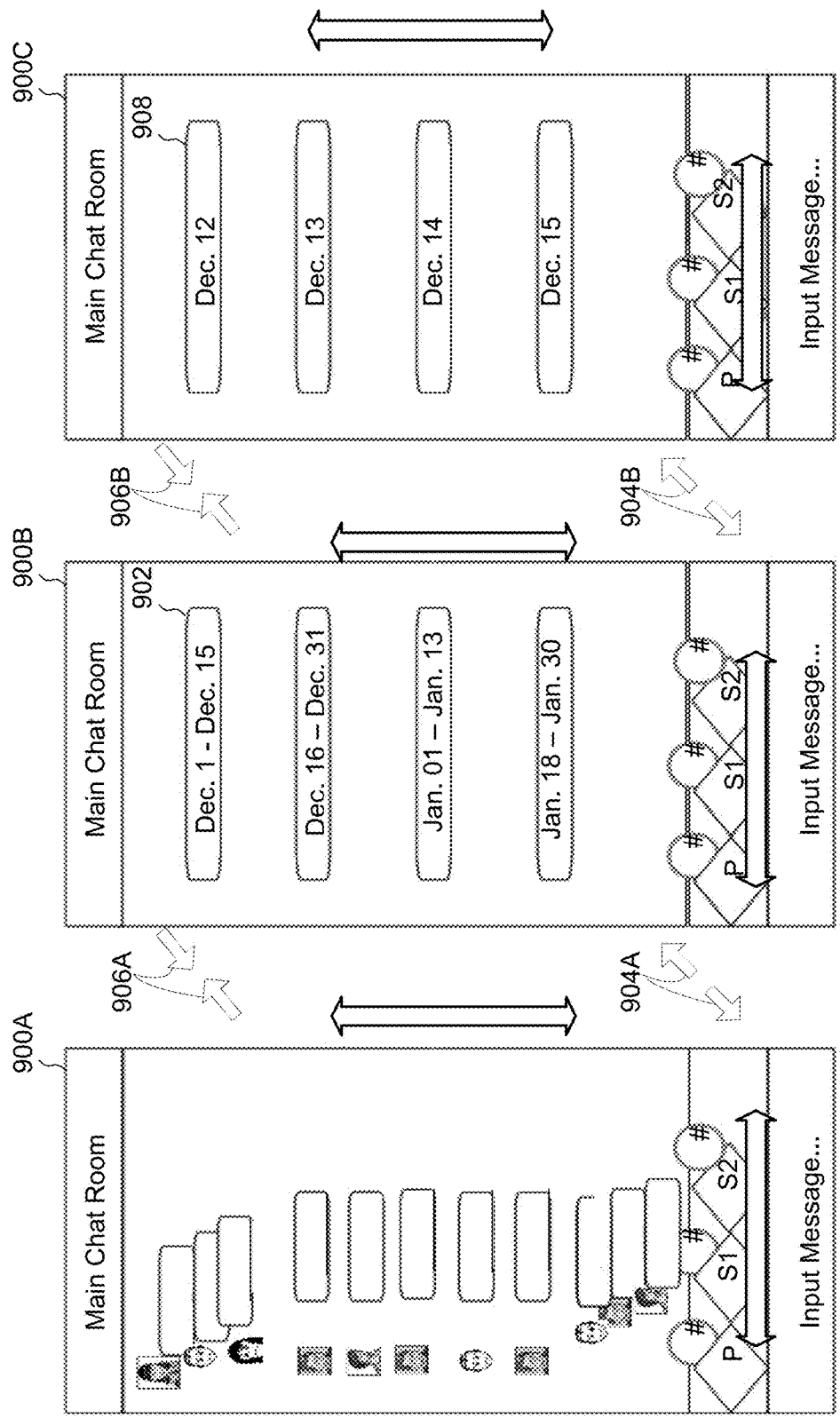
FIG. 9 is an example diagram illustrating the GUI function of organizing a plurality of hierarchically related messages by a date, according to embodiments.

FIG. 9 is an example diagram illustrating the GUI function of organizing a plurality of hierarchically related messages by a date, according to embodiments. Main chat room 900A, 900B, and 900C may represent alternate displays of the same main chat room. When a user views messages within main chat room 900A, the user may determine a date that each of the messages were generated on by shrinking or expanding the main chat room 900A, or clicking on a control button within the main chat room 900A, in order to provide main chat rooms 900B and/or 900C. For example, if at a first time a user is viewing messages within main chat room 900A, the user may desire to identify what date all of the messages were generated on. Accordingly, and in some embodiments, the user may use a hand gesture on a smart phone to shrink 906A the main chat room 900A to main chat room 900B. In some embodiments, the GUI within main chat room 900A may include an additional control button such that when a user selects the control button (e.g., via a pointer), then main chat room 900B may be provided.

The main chat room 900B may display a plurality of control buttons (e.g., control button 902) that when selected, the GUI may provide each message that corresponds to a range of dates. For example, when a user selects control button 902, each message that users generated between December 1 through December 15 may be displayed. In some embodiments, when the user uses a hand gesture to shrink 906B within the main chat room 900B (which may be a continuation of shrink 906A), the user may view chat room 900C in order to view exact dates (e.g., December 12). In some embodiments, the user may select a control button that corresponds to a range of dates within main chat room 900B (e.g., control button 902) in order to display individual dates as shown in main chat room 900C. For example, a user may select control button 902 (December 1-December 15) and consequently, each date that corresponds to each message that was generated between December 1-December 15 may be displayed, such as main chat room 900C that illustrates that December 12, 13, 14, and 15 are particular days that various messages were generated on. In some embodiments, when the user shrinks 906A from the main chat room 900A, the main chat room 900C will be provided first or instead of main chat room 900B. In other embodiments, when the user shrinks 906A from the main chat room 900A, the main chat rooms may be organized according to topic. For example, "shoes," "venue," "restaurants," etc. may be various topics within the main chat room 900A such that when a user selects a control button that corresponds to each topic, the GUI may transfer the user to the corresponding sub-chat room or location within the main chat room where the topic is being discussed.

In some embodiments, main chat room 900C may include a plurality of control buttons (e.g., control button 908) that correspond to individual dates such that when a user selects the control button, the user will be able to view each message that was written on that date. For example, if the user selects control button 908, the user will be able to view each message that was generated on December 12.

In some embodiments, a user may be within main chat room 900C and may desire to view individual messages as displayed in main chat rooms 900A and/or 900B. Accordingly, the user may utilize a hand gesture to expand 904B and/or 904A (or utilize an expand control button) to view the desired main chat rooms 900B and/or 900A. For example, if a user is within main chat room 900C, the user may utilize a small expand 904B gesture stroke to view main chat room 900B. The user may then continue with the expanding gesture (e.g., expand 904A) in order to view main chat room 900A.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 11:
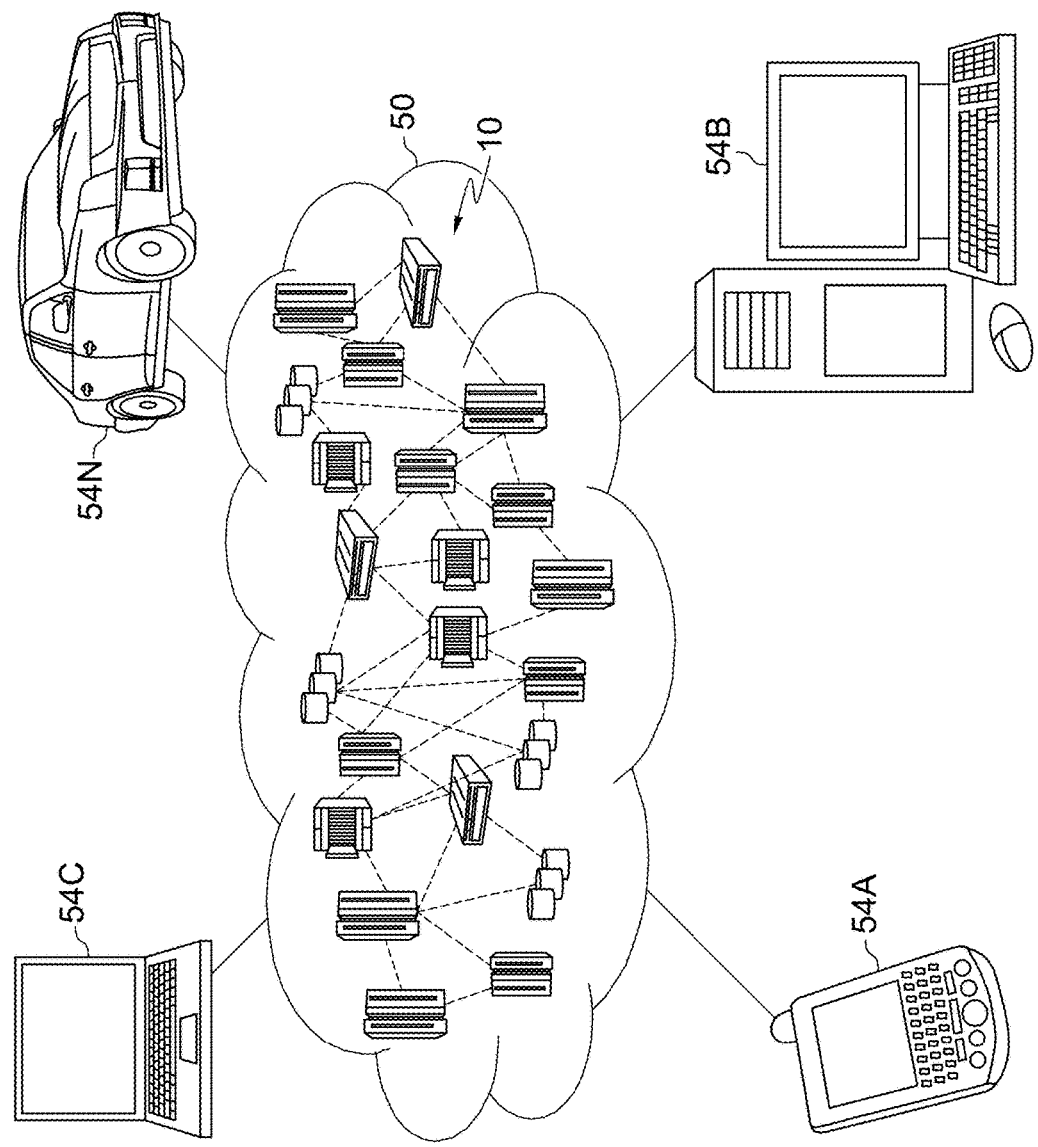
FIG. 11 depicts a cloud computing environment, according to embodiments.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
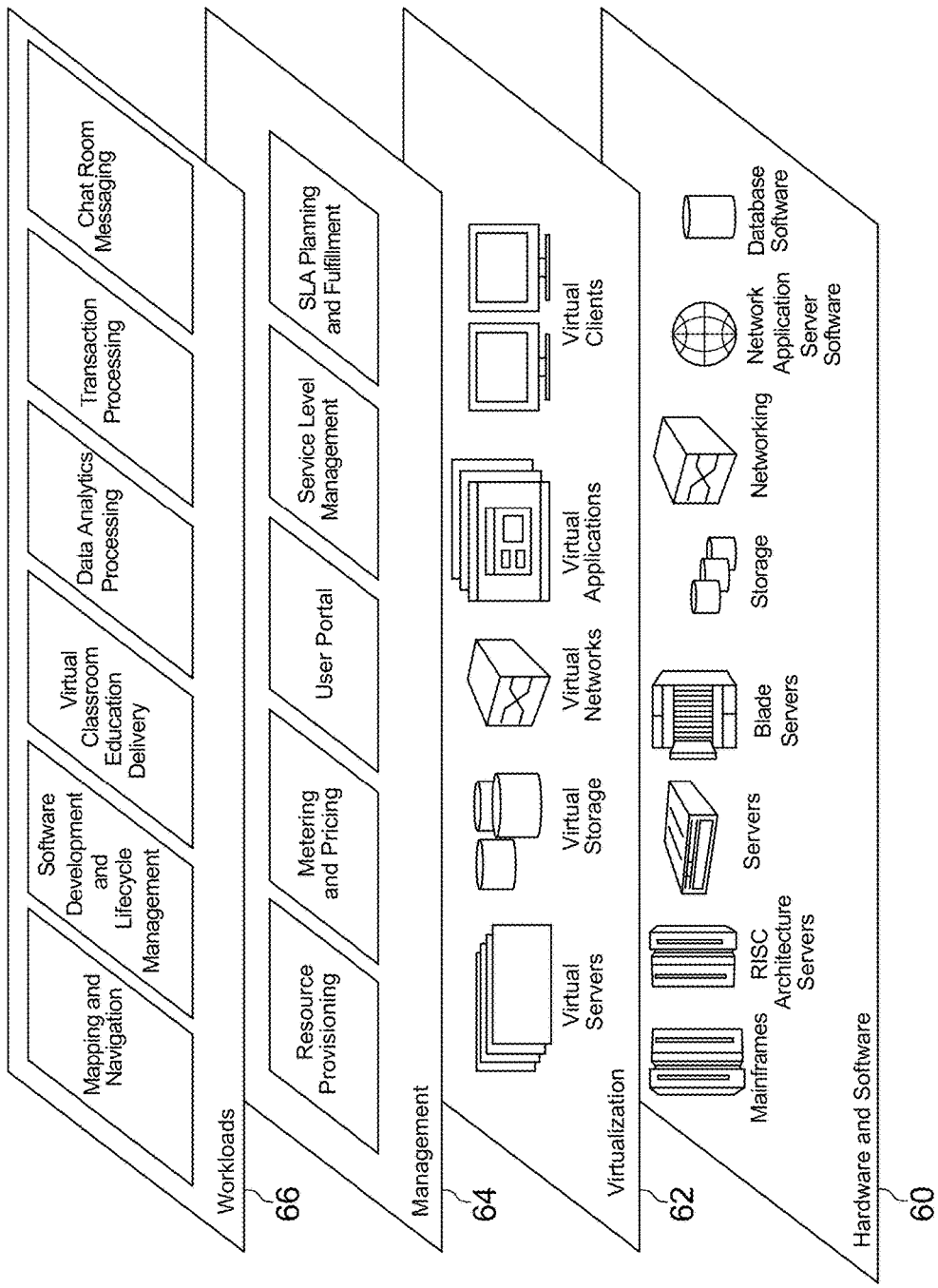
FIG. 12 depicts abstraction model layers, according to embodiments.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and chat room messaging 96.

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for grouping chat room messages according to a topic, the method comprising:
displaying a first message within a main chat room, the first message being associated with a first topic,
displaying a second message below the first message, the second message being associated with a second topic;
receiving a third message;
determining that the third message is associated with the first topic;
in response to the determining, displaying the third message by offsetting the third message below the first message, wherein the third message is displayed above the second message, the offsetting the third message below the first message indicating a hierarchical relationship between the first message and the third message; and
displaying a third control button within the main chat room, the third control button provides access to a first alternate chat room, wherein the first alternate chat room is displayed to a second window in response to the third control button being selected.

2. The method of claim 1, further comprising:
receiving, prior to receiving the third message, a first user request to reply to the first message with the third message; and
displaying a menu in response to receiving the first user request, the menu including a first option that specifies replying within the main chat room, the menu further including a second option that specifies replying within the first alternate chat room, the first alternate chat room for use in discussing the first topic.

3. The method of claim 2, further comprising:
receiving a second user request to reply to the first message within the first alternate chat room, wherein a user selects the first message and in response to the selection of the first message, the menu is displayed, and wherein the user selects the second option;
displaying, in response to receiving the second user request to reply within the first alternate chat room, the first alternate chat room; and
displaying the third message within the first alternate chat room.

4. The method of claim 3, further comprising displaying within the first alternate chat room, a first control button, wherein the first control button provides user access to the main chat room.

5. The method of claim 3, further comprising displaying within the first alternate chat room, a first control button, wherein the first control button provides user access to one or more unread messages within the main chat room, the first control button further specifying a first quantity of unread messages within the main chat room by displaying a numerical integer value of unread messages, the first control button further providing access to the main chat room, the main chat room being displayed in a first window, wherein there is no other chat room displayed to the first window, and the first alternate chat room being displayed in a second window, wherein there is no other chat room displayed to the second window.

6. The method of claim 3, further comprising:
receiving a fourth message;
determining the third message is further associated with a first subordinate topic of the first topic;
determining that the fourth message is associated with a second subordinate topic of the first subordinate topic; and
in response to the determining that the fourth message is associated with a second subordinate topic of the first subordinate topic, displaying by offsetting the fourth message below the third message within the first alternate chat room, the offsetting the fourth message below the third message indicating a hierarchical relationship between the third message and the fourth message, wherein the third message is offset below the first message and the fourth message is offset below the third message, and wherein the second message is not offset below the first message, the third message, or the fourth message.

7. The method of claim 6, further comprising:
receiving a third user request to reply within a second alternate chat room, the second alternate chat room for use in discussing the second subordinate topic;
displaying, in response to receiving the third user request, the second alternate chat room; and displaying the fourth message within the second alternate chat room.

8. The method of claim 6, further comprising:
displaying within the first alternate chat room, a first control button, wherein the first control button provides user access to a second alternate chat room, the second alternate chat room corresponding to the second subordinate topic of the first subordinate topic, the first subordinate topic being a sub-topic of the first topic; and
displaying within the second alternate chat room, a second control button, wherein the second control button provides user access to the main chat room.

9. The method of claim 6, further comprising:
displaying within the second alternate chat room, a first control button, wherein the first control button provides user access to one or more unread messages within the main chat room, the first control button further specifying a first quantity of unread messages within the main chat room; and
displaying within the first alternate chat room, a second control button, wherein the second control button provides user access to one or more unread messages within the second alternate chat room, the second control button further specifying a second quantity of unread messages within the second alternate chat room.

10. A system for grouping chat room messages according to a topic, the system comprising:
a computing device having a processor and a memory;
wherein the memory stores program instructions, the program instructions executable by the processor cause the system to:
display a first message within a main chat room, the first message being associated with a first topic;
display a second message below the first message, the second message being associated with a second topic;
receive a third message;
determine that the third message is associated with the first topic;
in response to the determining, display by offsetting the third message below the first message, wherein the third message is displayed above the second message, the offsetting the third message below the first message indicating a hierarchical relationship between the first message and the third message; and
display a third control button within the main chat room, the third control button provides access to a first alternate chat room, the first alternate chat room is displayed to a second window in response to the third control button being selected.

11. The system of claim 10, wherein the program instructions executable by the processor further cause the system to:
associate a plurality of messages with a date that each message of the plurality of messages was generated on, the plurality of messages including the first message, the plurality of messages including the second message, and the plurality of messages including the third message; and
display a plurality of control buttons within the main chat room, each of the plurality of control buttons specifying at least one of the dates, wherein the plurality of control buttons are selectable for a user to view at least one of the plurality of messages according to the date.

12. The system of claim 10, wherein the program instructions executable by the processor further cause the system to:
receive, prior to receiving the third message, a user request to reply, with the third message, to the first message within the first alternate chat room, the first alternate chat room for use in discussing the first topic;
display, in response to receiving the user request to reply to the first message within the first alternate chat room, the first alternate chat room; and
displaying the third message within the first alternate chat room.

13. A computer program product comprising a computer readable storage medium having program instructions embodied therewith, the program instructions executable by a computing device to cause the computing device to perform a method comprising:
displaying a first message within a main chat room, the first message being associated with a first topic,
displaying a second message below the first message, the second message being associated with a second topic;
receiving a third message;
determining that the third message is associated with the first topic;
in response to the determining, displaying by offsetting the third message below the first message, wherein the third message is displayed above the second message, the offsetting the third message below the first message indicating a hierarchical relationship between the first message and the third message;
displaying a menu in response to receiving a user request to respond to the first message, the menu including a first control button to give a user a first option to respond to the first message within the main chat room, the menu further including a second control button to give the user a second option to respond to the first message within a first alternate chat room; and
displaying a sixth control button within the main chat room, the sixth control button provides access to the first alternate chat room, wherein the first alternate chat room is displayed to a second window in response to the sixth control button being selected.

14. The computer program product of claim 13, wherein the method further comprises:
receiving, prior to receiving the third message, a first user request to reply, with the third message, to the first message within the first alternate chat room, the first alternate chat room for use in discussing the first topic;
displaying, in response to receiving the first user request, the first alternate chat room; and
displaying the third message within the first alternate chat room.

15. The computer program product of claim 14, wherein the method further comprises displaying within the first alternate chat room, a third control button, wherein the third control button provides user access to the main chat room.

16. The computer program product of claim 14, wherein the method further comprises displaying within the first alternate chat room, a third control button, wherein the third control button provides user access to one or more unread messages within the main chat room, the third control button further specifying a first quantity of unread messages within the main chat room.

17. The computer program product of claim 14, wherein the method further comprises:
receiving a fourth message;

determining the third message is further associated with a subordinate topic of the first topic;

determining that the fourth message is associated with the subordinate topic; and in response to the determining that the fourth message is associated with the subordinate topic, displaying by offsetting the fourth message below the third message within the first alternate chat room, the offsetting the fourth message below the third message indicating a hierarchical relationship between the third message and the fourth message.

18. The computer program product of claim 17, wherein the method further comprises:

receiving, prior to receiving the fourth message, a second user request to reply within a second alternate chat room, the second alternate chat room for use in discussing the subordinate topic;

displaying, in response to receiving the second user request, the second alternate chat room; and displaying the fourth message within the second alternate chat room.

19. The computer program product of claim 18, further comprising:

receiving a fifth message;

determining that the fifth message is associated with a second subordinate topic of the subordinate topic of the first topic;

displaying the fifth message in a third alternate chat room;

displaying, in the first alternate chat room, a third control button, wherein the third control button includes a topic identifier for the first subordinate topic and a numerical integer value indicating a number unread messages in the second alternate chat room, wherein the third control button provides access to the second alternate chat room;

displaying, in the first alternate chat room, a fourth control button, wherein the fourth control button includes a second topic identifier for the second subordinate topic and a second numerical integer value indicating a number of unread messages in the third alternate chat room, wherein the fourth control button provides access to the third alternate chat room;

displaying, in the second alternate chat room, a fifth control button, wherein the fifth control button includes a main chat room identifier and a third numerical integer value indicating a number of unread messages in the main chat room, wherein the fifth control button provides access to the main chat room.

* * * * *